(12) United States Patent
Thibodeau

(10) Patent No.: US 9,238,970 B2
(45) Date of Patent: Jan. 19, 2016

(54) BLADE OUTER AIR SEAL ASSEMBLY LEADING EDGE CORE CONFIGURATION

(75) Inventor: Anne-Marie B. Thibodeau, Winslow, ME (US)

(73) Assignee: United Technologies Corporation, Hartford, CT (US)

( * ) Notice: Subject to any disclaimer, the term of this patent is extended or adjusted under 35 U.S.C. 154(b) by 1143 days.

(21) Appl. No.: 13/235,589

(22) Filed: Sep. 19, 2011

(65) Prior Publication Data

US 2013/0071227 A1 Mar. 21, 2013

(51) Int. Cl.
*F01D 11/08* (2006.01)
*F01D 11/00* (2006.01)

(52) U.S. Cl.
CPC ............ *F01D 11/005* (2013.01); *F01D 11/001* (2013.01)

(58) Field of Classification Search
CPC ....... F01D 25/08; F01D 25/12; F01D 11/005; F01D 11/001; F01D 11/08; B22C 9/10
USPC ................ 415/115, 116, 170.1, 173.1, 173.3, 415/173.6, 174.4
See application file for complete search history.

(56) References Cited

U.S. PATENT DOCUMENTS

| | | | |
|---|---|---|---|
| 6,779,597 B2 * | 8/2004 | DeMarche et al. ........... 165/169 |
| 7,650,926 B2 | 1/2010 | Tholen | |
| 7,686,068 B2 | 3/2010 | Tholen et al. | |
| 7,874,792 B2 | 1/2011 | Tholen et al. | |
| 2008/0211192 A1* | 9/2008 | Pietraszkiewicz et al. ... 277/347 |
| 2009/0035125 A1* | 2/2009 | Fujimoto et al. .............. 415/116 |
| 2010/0080707 A1 | 4/2010 | Tholen | |

* cited by examiner

*Primary Examiner* — Craig Kim
*Assistant Examiner* — Maxime Adjagbe
(74) *Attorney, Agent, or Firm* — Carlson, Gaskey & Olds, P.C.

(57) ABSTRACT

An example blade outer air seal assembly may consist of a blade outer air seal containing channels that communicate cooling air through at least some of the blade outer air seal. The blade outer air seal has at least one circumferentially extending barrier separating the leading channel into a forward portion and an aft portion. Cooling air outlets from the leading channel are exclusively coupled to the aft portion.

18 Claims, 7 Drawing Sheets

BLADE OUTER AIR SEAL ASSEMBLY LEADING EDGE CORE CONFIGURATION

BACKGROUND

This disclosure relates to a blade outer air seal (BOAS) and, more particularly, to a multi-channel blade outer air seal (BOAS).

Gas turbine engines generally include fan, compressor, combustor and turbine sections along an engine axis of rotation. The fan, compressor, and turbine sections each include a series of stator and rotor blade assemblies. A rotor and an axially adjacent array of stator assemblies may be referred to as a stage. Each stator vane assembly increases efficiency through the direction of core gas flow into or out of the rotor assemblies.

An outer case, including a multiple of blade outer air seals (BOAS), provides an outer radial flow path boundary. A multiple of BOAS are typically provided to accommodate thermal and dynamic variation typical in a high pressure turbine (HPT) section of the gas turbine engine. The BOAS are subjected to relatively high temperatures and receive a secondary cooling airflow for temperature control. The secondary cooling airflow is communicated into the BOAS then through cooling channels within the BOAS for temperature control. The cooling channels used to communicate the cooling air through the blade outer air seal can provide entry points for hot gas ingestion if the back flow margin is not high enough.

SUMMARY

An example blade outer air seal assembly may consist of a blade outer air seal containing channels that communicate cooling air through at least some of the blade outer air seal. The blade outer air seal has at least one circumferentially extending barrier separating the leading channel into a forward portion and an aft portion. Cooling air outlets from the leading channel are exclusively coupled to the aft portion.

An example blade outer air seal casting core includes a core having a first open area configured to establish a corresponding axially extending barrier within a channel of a blade outer air seal, and a second open area configured to establish a corresponding circumferentially extending barrier within the channel of the blade outer air seal. The first open area may be positioned near a circumferential midpoint of the core.

A blade outer air seal cooling method including introducing cooling air to a leading channel established in a blade outer air seal, and communicating cooling air away from the leading channel using, exclusively, one or more outlets coupled with an aft portion of the leading channel.

These and other features of the disclosed examples can be best understood from the following specification and drawings, the following of which is a brief description.

DETAILED DESCRIPTION

Figure 1:
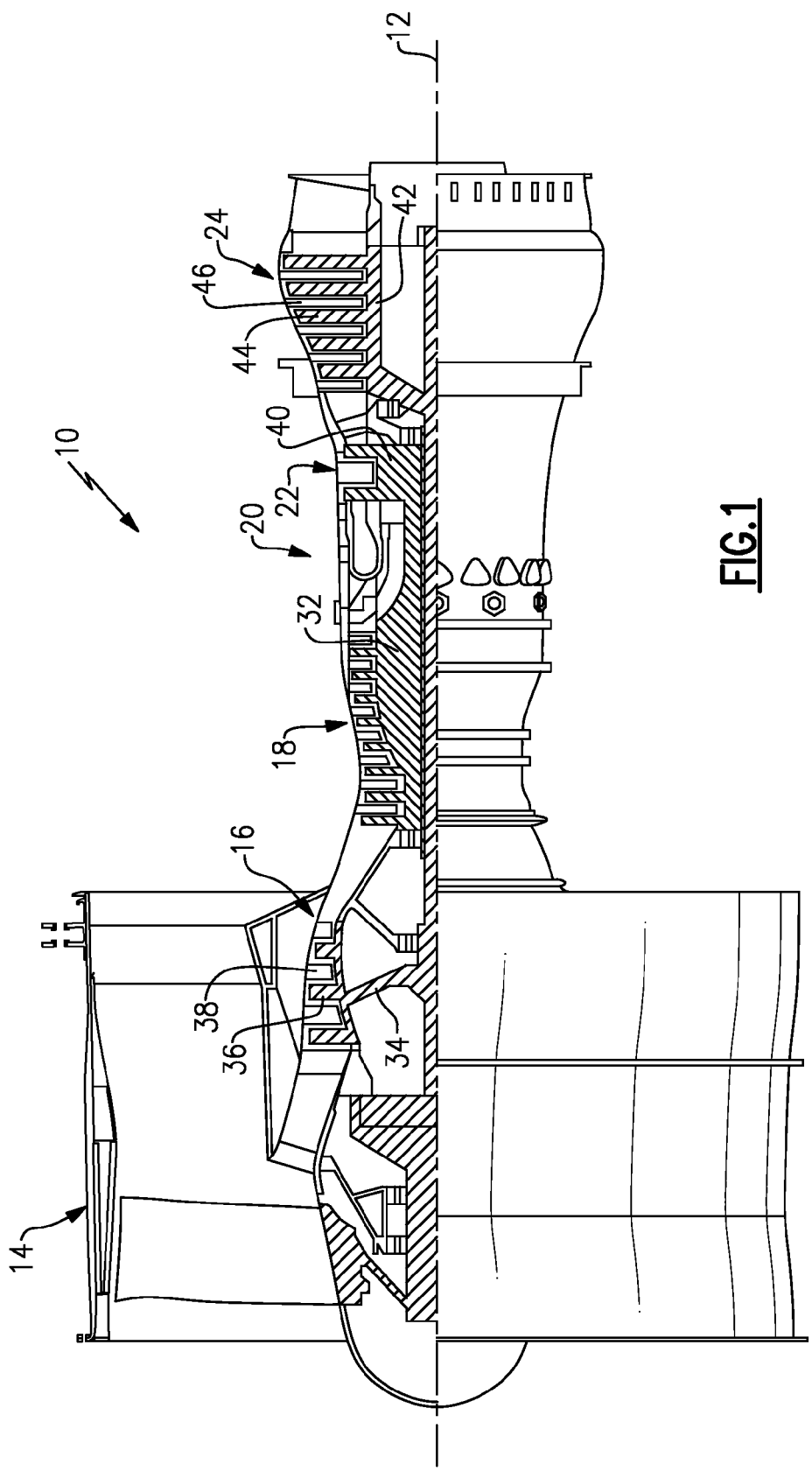
FIG. 1 shows a cross-section of an example turbomachine.

Referring to FIG. 1, an example turbomachine, such as a gas turbine engine 10, is circumferentially disposed about an axis 12. The gas turbine engine 10 includes a fan section 14, a low-pressure compressor section 16, a high-pressure compressor section 18, a combustion section 20, a high-pressure turbine section 22, and a low-pressure turbine section 24. Other example turbomachines may include more or fewer sections.

During operation, air is compressed in the low-pressure compressor section 16 and the high-pressure compressor section 18. The compressed air is then mixed with fuel and burned in the combustion section 20. The products of combustion are expanded across the high-pressure turbine section 22 and the low-pressure turbine section 24.

The high-pressure compressor section 18 includes a rotor 32. The low-pressure compressor section 16 includes a rotor 34. The rotors 32 and 34 are configured to rotate about the axis 12. The example rotors 32 and 34 include alternating rows of rotatable airfoils or rotatable blades 36 and static airfoils or static blades 38.

The high-pressure turbine section 22 includes a rotor 40 that is rotatably coupled to the rotor 32. The low-pressure turbine section 24 includes a rotor 42 that is rotatably coupled to the rotor 34. The rotors 40 and 42 are configured to rotate about the axis 12 in response to expansion to drive the high-pressure compressor section 18 and the low-pressure compressor section 16. The example rotors 40 and 42 include alternating rows of rotatable airfoils or rotatable blades 44 and static airfoils or static vanes 46.

The examples described in this disclosure is not limited to the two-spool gas turbine architecture described, and may be used in other architectures, such as a single-spool axial design, a three-spool axial design, and still other architectures. That is, there are various types of gas turbine engines, and other turbomachines, that can benefit from the examples disclosed herein.

Figure 2:
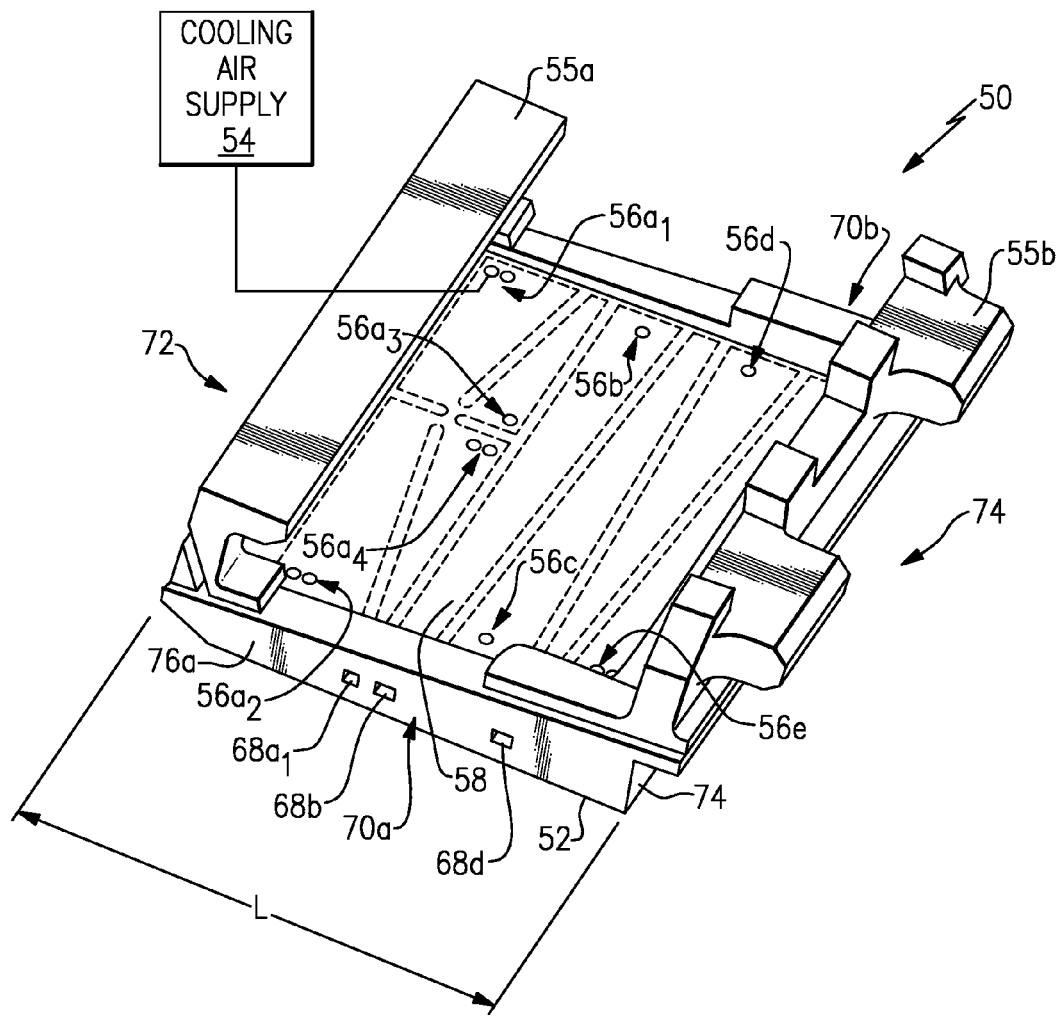
FIG. 2 shows a perspective view of an example blade outer air seal from the FIG. 1 turbomachine.
Figure 3:
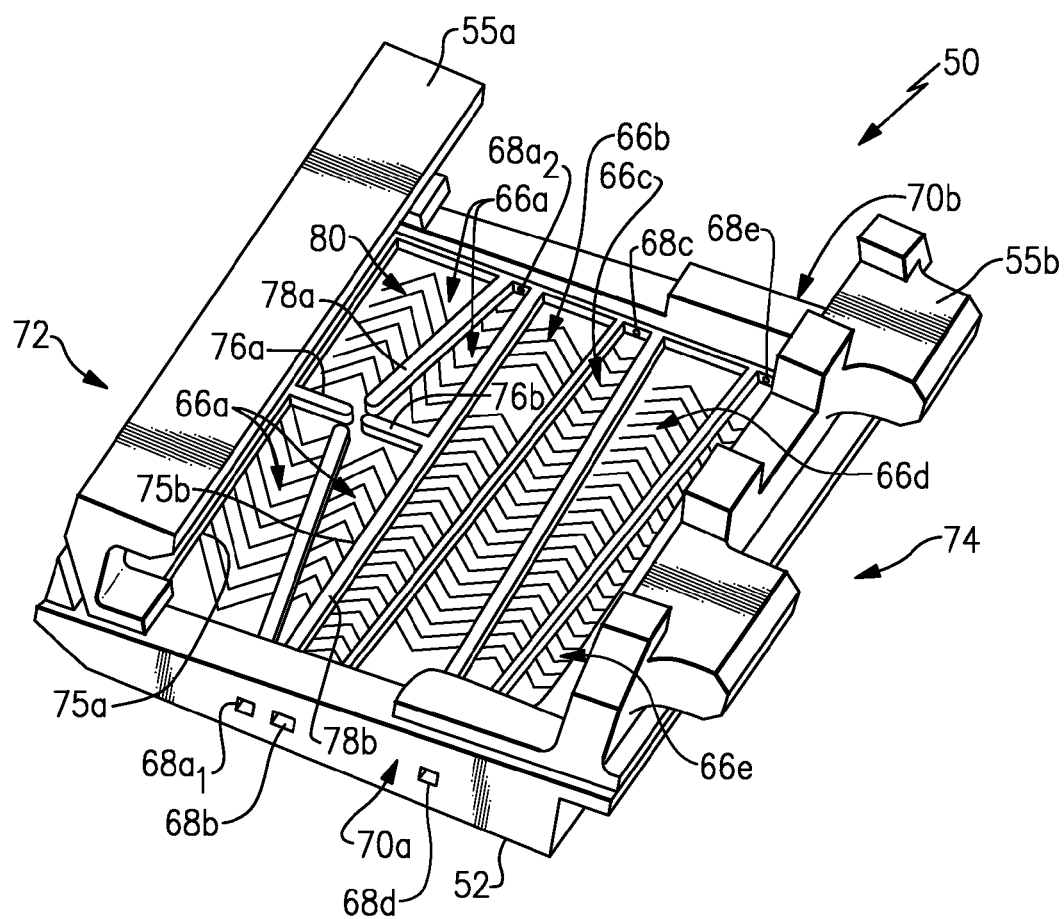
FIG. 3 shows a perspective view of the FIG. 2 blade outer air seal at a radial cross-section through the cooling channels.

Referring to FIGS. 2 and 3 with continuing reference to FIG. 1, an example blade outer air seal (BOAS) 50 is suspended from an outer casing of the gas turbine engine 10. In this example, the BOAS 50 is located within the high-pressure turbine section 22 of the gas turbine engine 10. During operation of the gas turbine engine 10, an inwardly facing surface 52 of the example BOAS 50 interfaces and seals against tips of blades 40 in known manner.

Attachment structures are used to secure the BOAS 50 within the engine 10. The attachment structures in this example include a leading hook 55a and a trailing hook 55b.

The BOAS 50 is one of a group of several BOASs that circumscribe the rotor 42. The BOAS 50 establishes an outer diameter of the core flow path through the engine 10. Other areas of the engine 10 include other circumferential ring arrays of BOASs that circumscribe a particular blade stage of the engine 10.

Cooling air is moved through the BOAS 50 to communicate thermal energy away from the BOAS 50. The cooling air moves from a cooling air supply 54 through apertures, such as inlet holes $56a_1$-$56e$, established in an outwardly facing surface 58 of the BOAS 50. The cooling air supply 54 is located radially outboard from the BOAS 50.

Cooling air moves radially through the inlet holes $56a_1$-$56a_4$ into a channel $66a$ established within the BOAS 50. The inlet holes $56a_1$ and $56a_2$ are considered primary inlet holes, and the inlet holes $56a_3$ and $56a_4$ are secondary inlet holes (or optional resupply holes). Cooling air also moves radially through the inlet holes 56b into a cavity 66b, through the inlet holes 56c into a channel 66c, through the inlet holes 56d into a channel 66d, and through the inlet holes 56e into a channel 66e. Cooling air is not free to move between the cavities 66a-66e after entering the cavities 66a-66e.

The cooling air exits the BOAS 50 through apertures, such as outlet holes $68a_1$-68e, which are established in circumferential end portion 70a or a circumferential end portion 70b of the BOAS 50. In this example, the outlet holes $68a_1$ and $68a_2$ communicate cooling air away from the channel 66a exclusively. Also, the outlet hole 68b communicates cooling air away from the channel 66b, the outlet hole 68c communicates cooling air away from the channel 66c, etc.

The cooling air moves circumferentially as the cooling air exits the BOAS 50 through the outlet holes $68a_1$-68e. The cooling air moving from the outlet holes $68a_1$-68e contacts a circumferentially adjacent BOAS within the engine 10. The BOAS 50 may interface with the circumferentially adjacent BOAS through a shiplapped joint, for example.

The example BOAS 50 extends axially from a leading edge 72 to a trailing edge 74. Notably, the outlet holes $68a_1$-68e in the example BOAS 50 are spaced from the leading edge 72. The channel 66a is considered a leading channel as the channel 66a is the channel of BOAS that is closest to the leading edge 72.

Specifically, the outlet holes 68a1 through 68e are axially spaced from the leading edge 72.

The channel 66a closest to the leading edge 72 includes a front edge 75a and a rear edge 75b. The outlet holes $68a_1$ and $68a_2$ are each aft the front edge 75a. Also, each of the outlet holes $68a_1$ and $68a_2$ (in this example) is aft the leading hook 55a. The remaining channels 66b-66e (and their respective outlet holes 68b-68e) are aft of channel 66a. Thus, no cooling air moves from the BOAS 50 forward the front edge 75a or leading hook 55a.

Regarding the channel 66a, the outlet holes $68a_1$ and $68a_2$, are each closer to the rear edge 75b than the front edge 75a. The gas path pressure of the main flow path through the engine 10 is lower near the axially trailing edge 74 than the axially leading edge 72. Thus, moving cooling air outlet holes $68a$ and $68a_2$ rearward increases back flow margin and lessens the likelihood of ingestion from the main flow path into the channel 66a.

Features of the BOAS 50 manipulate flow of cooling air through the channel 66a. Such features include axially extending barriers 76a and 76b, circumferentially extending barriers 78a and 78b, and trip strips 80. In this example, the cavities 66b-66e also include trip strips 80, but do not include axially or circumferentially extending barriers.

The example axially extending barriers 76a and 76b project radially from an inner diameter surface 82 of the channel 66a and contact the outwardly facing surface 58. The axially extending barrier 76a is a leading axial barrier. The axially extending barrier 76b is a trailing axial barrier. The example axially extending barriers 76a and 76b are positioned near a circumferential middle of the channel 66a and limit circumferential flow of cooling air through the channel 66a. The barriers 76a and 76b are axially aligned with the axis of rotation 12 (FIG. 1). The barriers 76a and 76b are also perpendicular to the front edge 75a.

The example circumferentially extending barriers 78a and 78b also project radially from the inner diameter surface 82 of the channel 66 and contact the outwardly facing surface 58. The example barriers 78a and 78b are designed to maximize heat transfer coefficients in the channel 66a. The example circumferentially extending barriers 78a and 78b are tapered relative to the front edge 75a and the rear edge 75b, which help focus flow of cooling air within the channel 66a and limits axial flow of cooling air through the channel 66a. The circumferentially extending barriers 78a and 78b are both tapered toward the axially extending barrier 76a.

The trip strips 80 project radially from the inner diameter surface 82 of the channel 66a, but do not contact the outwardly facing surface 58. The trip strips 80 turbulate flow of cooling air within the channel 66a, which facilitates transfer of thermal energy from the BOAS 50 to the cooling air.

Figure 4:
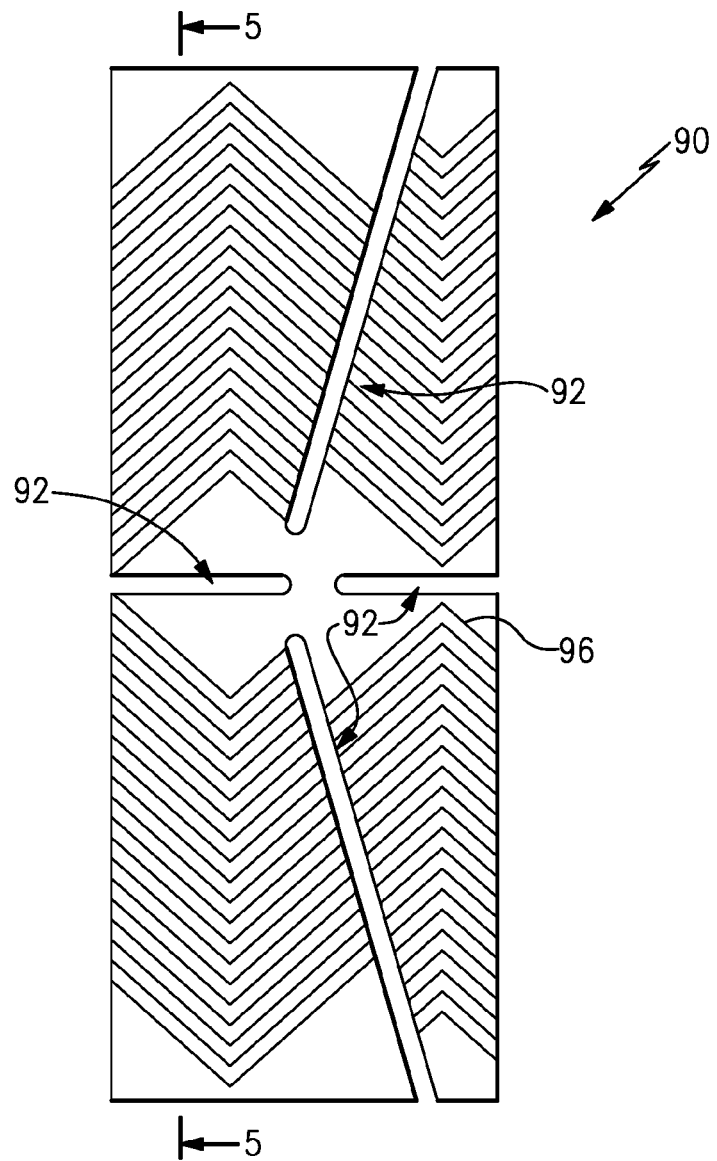
FIG. 4 shows an inwardly facing surface of a core used to form a leading channel in the FIG. 2 blade outer air seal.
Figure 5:
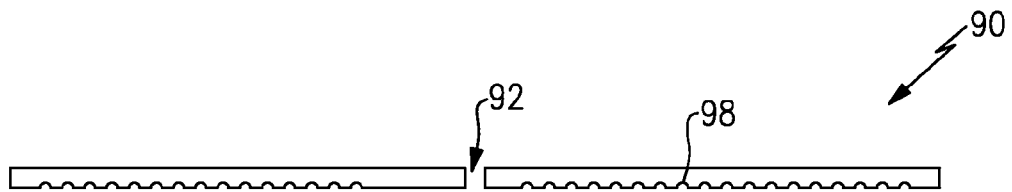
FIG. 5 shows a section view at line 5-5 in FIG. 4.

Referring now to FIGS. 4 and 5 with continuing reference to FIGS. 2 and 3, in this example, the channel 66a is formed within the BOAS 50 using an investment casting process. A ceramic core 90 can be used during the casting process to establish the channel 66a and the features within the channel 66a. Open areas 92 of the core 90 receive material that establishes the barriers 76a, 76b, 78a, and 78b. Grooves 98 in the core 90 establish the trip strips 80. The other cavities 66b-66e are formed using other cores (not shown).

Figure 6:
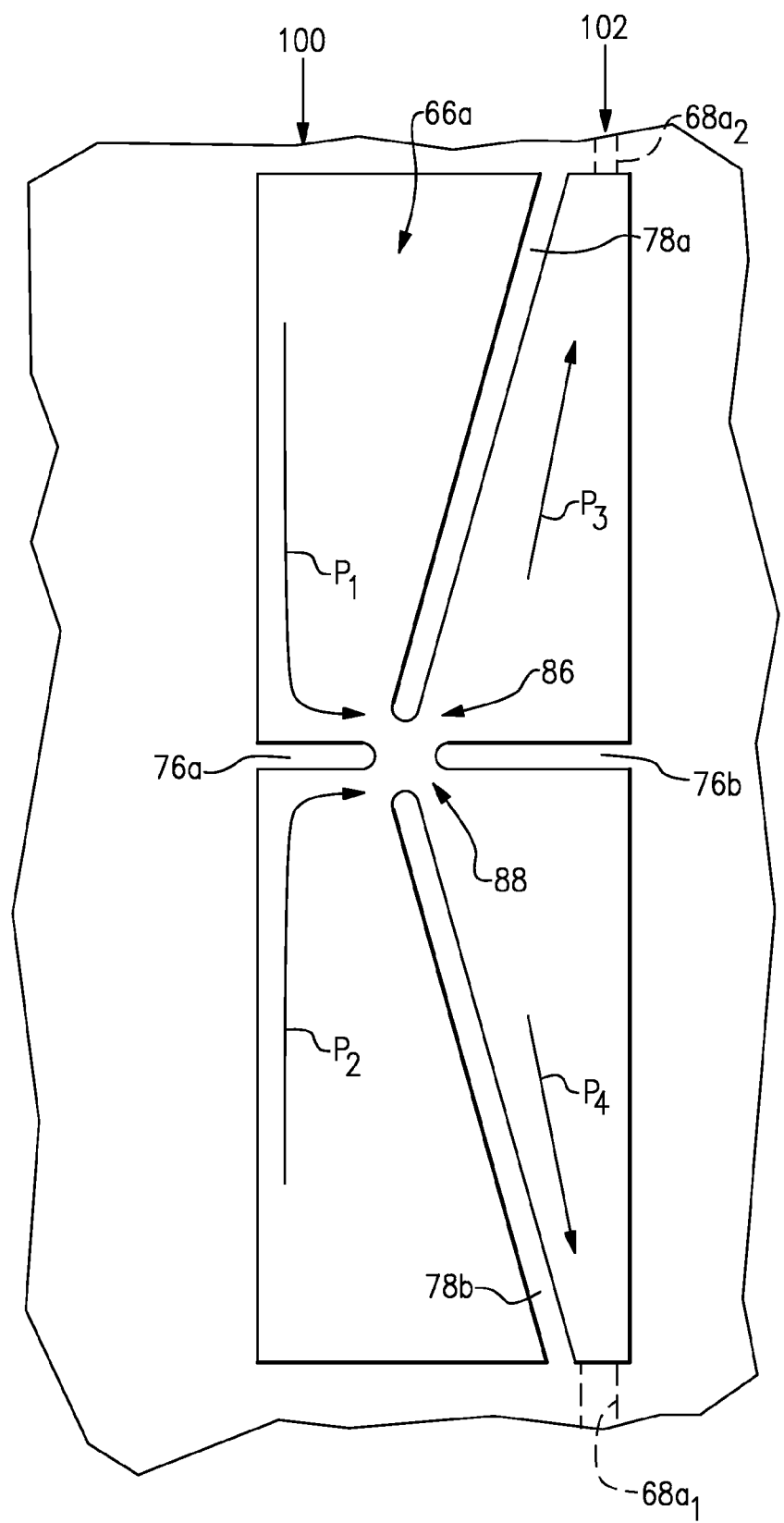
FIG. 6 shows a simplified view of flow through the leading channel in the FIG. 2 blade outer air seal.

Referring now to FIG. 6 with continuing reference to FIG. 2, the circumferentially extending barriers 78a and 78b divide the channel 66a into a forward channel portion 100 and an aft channel portion 102. During operation, cooling air entering the channel 66a through the primary inlet holes $56a_1$ moves generally along path $P_1$ and cooling air entering the channel 66 through primary inlet holes $56a_2$ moves generally along path $P_2$. The paths $P_1$ and $P_2$ are both in the forward channel portion 100.

Cooling air moving along the paths $P_1$ and $P_2$ contacts the barrier 76a, which redirects cooling air moving along the paths $P_1$ and $P_2$ through one or both of the openings 86 and 88. The opening 86 is established between the barriers 76b and 78a. The opening 88 is established between the barriers 76b and 78b. The cooling air transitions from the forward channel portion 100 to the aft channel portion 102 as the cooling air moves through one of the openings 86 or 88.

Cooling air that has moved through the opening 86 then moves generally in a direction $P_3$ to the corresponding outlet hole $68a_2$. Cooling air that has moved through the opening 88 moves generally in a direction $P_4$ to the other one of the outlet holes $68a_1$. Cooling air that has moved along the path $P_1$ and is redirected into the opening 86 thus flows in opposite circumferential directions within the channel 66a. Similarly, cooling air that has moved along path $P_2$ and is redirected into the opening 88 flows in opposite circumferential directions within the channel 66a. The outlet holes $68a_1$ and $68a_2$ are both within (or coupled to) the aft channel portion 102.

Additional cooling air may be introduced to the channel 66a though the resupply inlet holes $56a_3$. This additional cooling air is combined with the cooling air that has moved through the opening 86 and is moving along the path $P_3$. Additional cooling air may be introduced to the channel 66a though the resupply inlet hole $56a_4$. This additional cooling air is combined with the cooling air that has moved through the opening 88 and is moving along the path $P_4$. The resupply inlet holes $56a_3$ and $56a_4$ are optional. That is, the primary inlet holes 56a and 56b may be used exclusively to move air into the channel 66a.

As can be appreciated, tapering the barriers 78a and 78b focuses flow of cooling air toward the barrier 76a when the air moves along the paths $P_1$ and $P_2$, and focuses flow of cooling air toward one of the outlet holes $68a_1$ and $68a_2$ when the air moves along the paths $P_3$ and $P_4$. The example barriers 76a, 76b, 78a, and 78b do not extend across the entire channel 66a. Thus, the channel 66a is considered a single channel separate from the other cavities 66b-66e.

Figure 7:
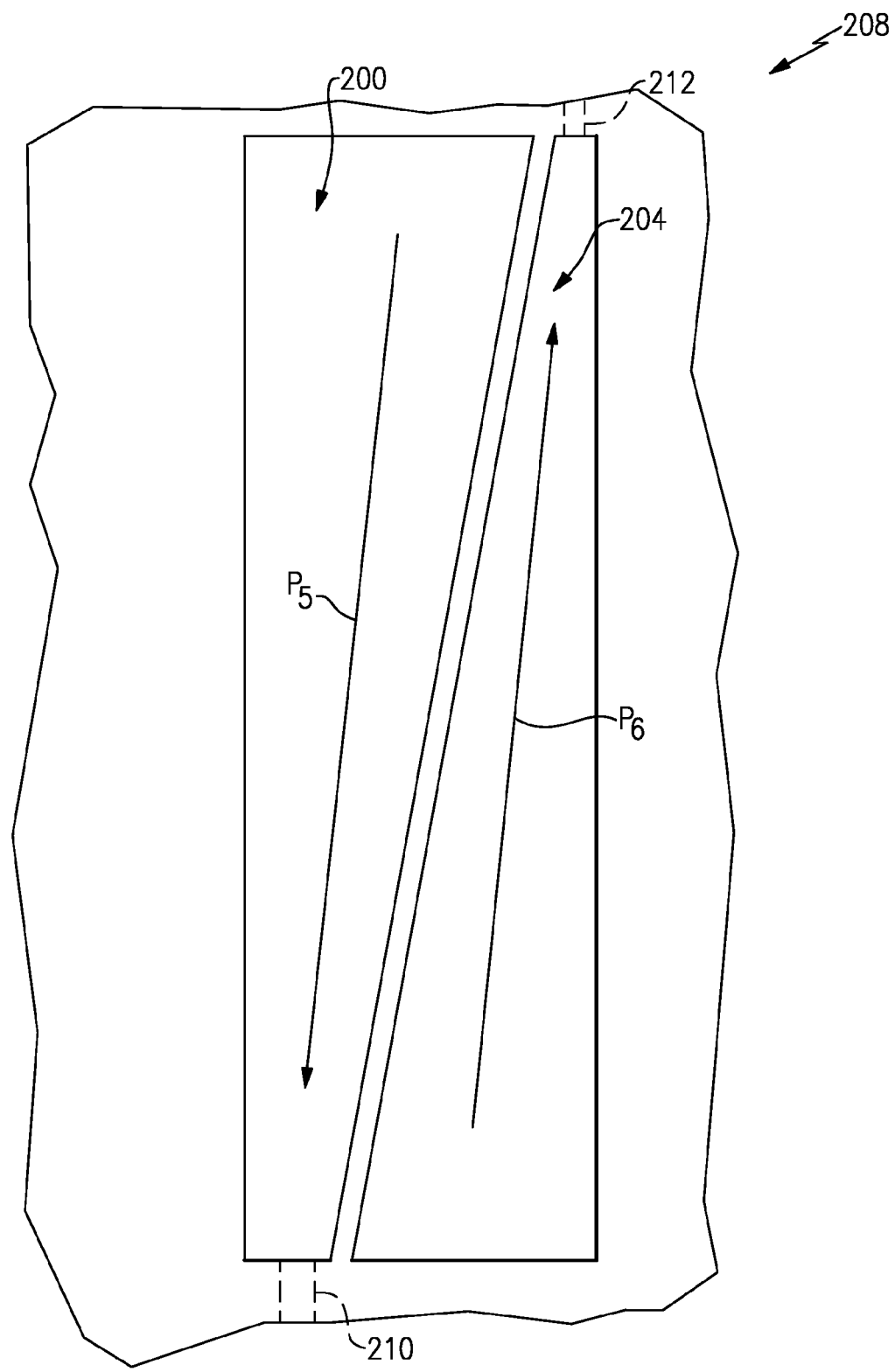
FIG. 7 shows a simplified view of flow through the leading channel in a PRIOR ART blade outer air seal.
Figure 8:
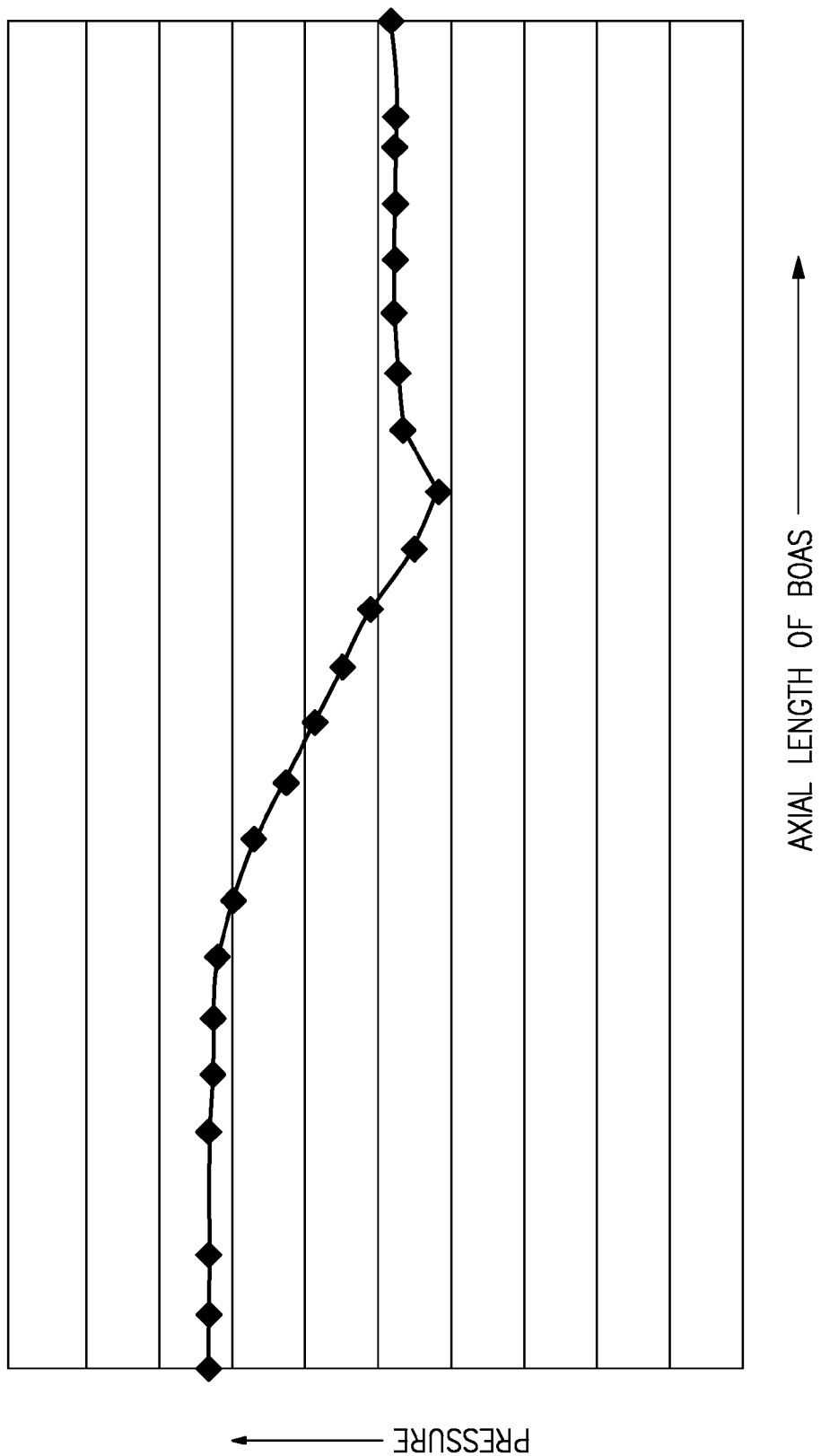
FIG. 8 graphically shows example pressures at different axial locations along the FIG. 2 blade outer air seal.

Referring now to FIG. 7 with continuing reference to FIG. 6, leading edge cavities 200 and 204 in a prior art blade outer air seal 208 communicate air along a path $P_5$ or $P_6$ in a single circumferential direction. The air moving along path $P_5$ exits the channel 200 at an outlet 210. The air moving along path $P_6$ exits the channel at an outlet 212.

Circulating cooling air flow circumferentially through only about half of the circumferential channel length of the BOAS 50, means that the cooling air moving along paths $P_1$ and $P_2$ is cooler than the cooling air that has moved the full circumferential channel length, such as the air moving along paths $P_5$ and $P_6$. The cooler air can be reused to cool by being moved along paths $P_3$ and $P_4$. Reducing the cooling air requirement is desirable in jet engines. However, if more cooling air needs to move along paths $P_3$ and $P_4$, the additional air can be fed through secondary inlet holes (resupply holes) $56a_3$ and $56a_4$.

Features of the disclosed embodiments include directing cooling air to exit farther axially aft of a BOAS leading edge into a lower gas path pressure. Communicating cooling air to a lower exit pressure reduces the chance of hot gas ingestion into the BOAS and helps to satisfy Back Flow Margin Requirements. The efficiency of the turbomachine is also improved because less cooling air is required than prior art designs. The leading edge of the BOAS is able to be maintained at a lower temperature.

Another feature is more control over cooling flow at the leading edge of the blade outer air seal. For example, the disclosed embodiments provide more uniform circumferential cooling of the blade outer air seal. In the disclosed embodiments, the majority of the cooling air travels through about half of the blade outer air seal's circumferential length rather than the entire circumferential length, which provides more cooling if the leading edge is hot.

Yet another feature is the ability to add more cooling flow if the leading edge of the blade outer air seal is a hot spot. For example, resupply holes can reduce the temperature of the cooling air after the cooling air has passed through the openings 86 and 88.

Still another feature is that, if film credit is take for Leading Edge Purge, (cooling air that dumps directly to the gas path between the first vane and first blade outer air seal), the cooling flow to the leading edge channel can be reduced (lower cooling air requirement results in higher efficiency for the engine). Alternatively, resupply holes can be added to reduce the cooling flow temperature before cooling the second row (which results in an increased heat transfer coefficient in the second row and a cooling blade outer air seal).

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:

1. A blade outer air seal assembly, comprising:
    a blade outer air seal establishing a leading channel that communicates cooling air through at least some of the blade outer air seal,
    the blade outer air seal having at least one circumferentially extending barrier separating the leading channel into a forward portion and an aft portion, the forward portion closer to a leading edge of the blade outer air seal than the aft portion, wherein cooling air outlets from the leading channel are exclusively coupled to the aft portion; and
    the blade outer air seal having at least one axially extending barrier that redirects at least some of the cooling air circumferentially within the leading channel.

2. The blade outer air seal assembly of claim 1, wherein the blade outer air seal has a leading attachment structure and a trailing attachment structure, wherein all the cooling air outlets from the leading channel are aft the leading attachment structure.

3. The blade outer air seal assembly of claim claim 1, wherein the at least one axially extending barrier is positioned at a circumferential center of the blade outer air seal and is configured to be parallel to a rotational axis of a turbomachine.

4. The blade outer air seal assembly of claim 1, wherein the at least one axially extending barrier causes the cooling air to flow circumferentially within the leading channel in opposite directions.

5. The blade outer air seal assembly of claim 1, wherein the at least one axially extending barrier is circumferentially spaced from opposing circumferential ends of the blade outer air seal, and portions of the leading channel are established on opposing, circumferential sides of the blade outer air seal.

6. The blade outer air seal assembly of claim 1, wherein the at least one circumferentially extending barrier is axially tapered toward at least one axially extending barrier of the blade outer air seal.

7. The blade outer air seal assembly of claim 1, wherein all the cooling air outlets from the leading channel are axially between the at least one circumferentially extending barrier and a trailing edge of the blade outer air seal.

8. The blade outer air seal assembly of claim 1, including at least one primary inlet aperture established near a circumferential end of the blade outer air seal, and at least one resupply inlet aperture established near a circumferential center of the blade outer air seal, the at least one primary inlet aperture and the at least one resupply inlet aperture configured to deliver cooling air to the leading channel.

9. The blade outer air seal assembly of claim 1, including trip strips extending radially into the channel.

10. The blade outer air seal assembly of claim 1, wherein a majority of the leading channel is established within an axially forward third of the blade outer air seal.

11. A blade outer air seal casting core, comprising:
    a core having at least one first open area configured to establish a corresponding axially extending barrier within a channel of a blade outer air seal, and at least one second open area configured to establish a corresponding circumferentially extending barrier within the channel of the blade outer air seal, wherein the at least one first open area is positioned near a circumferential midpoint of the core, wherein the at least one first open area comprises a leading first open area and a trailing first open area, and the second open areas taper toward the leading first open area.

12. The blade outer air seal casting core of claim 11, wherein the at least one first open area is perpendicular to an axially leading edge of the core.

13. The blade outer air seal casting core of claim 11, wherein the at least one first open area is established near a circumferential center of the core.

14. The blade outer air seal casting core of claim 11, wherein the channel is a leading channel.

15. A blade outer air seal cooling method, comprising:
introducing cooling air to a leading channel established in a blade outer air seal, the leading channel having an aft portion and a forward portion that is closer to a leading edge of the blade outer air seal than the aft portion; and
communicating cooling air away from the leading channel using exclusively one or more outlets coupled with the aft portion of the leading channel; and
redirecting at least some of the cooling air circumferentially within the leading channel using an axially extending barrier.

16. The blade outer air seal cooling method of claim 15, communicating cooling air from the leading channel to a circumferential end face of the blade outer air seal.

17. The blade outer air seal cooling method of claim 15, including communicating cooling air through the leading channel in opposing circumferential directions.

18. The blade outer air seal cooling method of claim 15, wherein at least one circumferential barrier separates the leading channel into the forward portion and the aft portion.

\* \* \* \* \*